United States Patent [19]

Novak

[11] Patent Number: 4,814,397
[45] Date of Patent: Mar. 21, 1989

[54] STABILIZED POLYACETAL COMPOSITIONS

[75] Inventor: Ernest R. Novak, Vienna, W. Va.

[73] Assignee: E. I. Du Pont de Nemours and Company, Wilmington, Del.

[21] Appl. No.: 20,083

[22] Filed: Feb. 27, 1987

Related U.S. Application Data

[63] Continuation-in-part of Ser. No. 852,472, Apr. 15, 1986, abandoned.

[51] Int. Cl.$^4$ ............................................. C08L 61/00
[52] U.S. Cl. .................................. 525/154; 525/398; 525/401
[58] Field of Search ............... 525/154, 401, 185, 398, 525/472

[56] References Cited

U.S. PATENT DOCUMENTS

| | | | |
|---|---|---|---|
| 2,993,025 | 7/1961 | Alsup et al. | 260/42 |
| 3,027,352 | 3/1962 | Walling et al. | 260/67 |
| 3,204,014 | 8/1965 | Green | 260/895 |
| 3,210,322 | 10/1965 | Polly et al. | 260/45.95 |
| 3,215,671 | 11/1965 | Melby | 260/67 |
| 3,219,127 | 11/1965 | van der Lily et al. | 172/449 |
| 3,219,621 | 11/1965 | Prichard | 260/45.95 |
| 3,219,727 | 11/1965 | Kray et al. | 525/154 X |
| 3,310,608 | 3/1967 | Matsubayashi et al. | 260/897 |
| 3,322,740 | 5/1967 | Kiff et al. | 260/88.3 |
| 3,406,129 | 10/1968 | Price | 260/13 |
| 3,406,130 | 10/1968 | Neff | 260/13 |
| 3,459,789 | 8/1969 | Muller et al. | 260/482 |
| 3,743,614 | 7/1973 | Wolters et al. | 260/18 R |
| 3,787,353 | 1/1974 | Ishii et al. | 260/45.9 P |
| 3,960,984 | 6/1976 | Kohan | 260/857 F |
| 4,098,843 | 7/1978 | Johnson | 260/857 F |
| 4,386,178 | 5/1983 | Schuette et al. | 524/100 |
| 4,464,435 | 8/1984 | Hattori | 428/409 |
| 4,555,357 | 11/1985 | Kausga et al. | 252/513 |

FOREIGN PATENT DOCUMENTS 1432968 6/1968 Japan .
43-14329 6/1968 Japan .
2266968 9/1968 Japan .
61-69859 4/1986 Japan .

Primary Examiner—Theodore E. Pertilla

[57] ABSTRACT

Incorporation of 0.1–10 weight percent of certain polymers and/or oligomers containing both hydroxy groups and at least one other functional group that is a stronger Lewis base than the hydroxy groups into polyacetal molding compositions results in improved thermal stability of such compositions.

21 Claims, No Drawings

STABILIZED POLYACETAL COMPOSITIONS

CROSS REFERENCE TO RELATED APPLICATIONS

This application is a continuation-in-part of U.S. application Ser. No. 852,472, filed Apr. 15, 1986, now abandoned.

DESCRIPTION

1. Technical Field

This invention relates to certain polyacetal compositions which are characterized by improved stability and processing. Polyacetal compositions are generally understood to include compositions based on homopolymers of formaldehyde, the terminal groups of which are end-capped by esterification or etherification, as well as copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification. The proportion of the comonomers can be up to 20 weight percent. Compositions based on polyacetals of relatively high molecular weight, i.e. 10,000 to 100,000 are useful in preparing semi-finished and finished articles by any of the techniques commonly used with thermoplastic materials, e.g. compression molding, injection molding, extrusion, blow molding, rotational molding, melt spinning, stampin and thermoforming. Finished articles made from such compositions possess desirable physical properties, including high stiffness, strength, low coefficient of friction and good solvent resistance. However, in certain applications, it would be desirable to have greater stability than has heretofore been possible with conventional polyacetal compositions.

2. Background Art

U.S. Pat. No. No. 2,993,025, granted July 18, 1961 to Alsup et al; U.S. Pat. No. 3,027,352, granted Mar. 27, 1962 to Walling et al; U.S. Pat. No. 3,204,014, granted Aug. 31, 1965 to Green; U.S. Pat. No. 3,210,322, granted Oct. 5, 1965 to Polly et al.; U.S. Pat. No. 3,215,671, granted Nov. 2, 1965 to Melby; U.S. Pat. No. 3,219,127, granted Nov. 23, 1965 to Kray et al.; U.S. Pat. No. 3,459,789, granted Aug. 5, 1969 to Muller et al; U.S. Pat. No. 3,743,614, granted July 3, 1973 to Wolters et al; U.S. Pat. No. 3,787,353, granted Jan. 22, 1974 to Ishii et al; U.S. Pat. No. 3,960,984, granted June 1, 1976 to Kohan; U.S. Pat. No. 4,098,843, granted July 4, 1978 to Johnson; U.S. Pat. No. 4,464,435, granted Aug. 7, 1984 to Hattori et al.; Japanese Patent Publication NO. 14329/68, published June 17, 1968; Japanese patent publication No. 22669/68, published Sept. 30, 1968; and Japanese patent publication No. 48051/75, published in 1975; all disclose various polyacetal compositions, both those based on homopolymers and those based on copolymers, and various techniques for stabilizing such compositions. Alsup discloses stabilization of polyacetal compositions by blending therewith a synthetic polyamide. Walling discloses that the thermal stability of certain polyacetal copolymer compositions is improved as compared with corresponding homopolymer. Green discloses N-vinyl pyrrolidone/acrylamide copolymers as stabilizers for polyacetals. Polly et al. discloses carboxylic polyamides, polyurethanes, substituted polyacrylamides, polyvinyl pyrrolidone, and hydrazines as scission inhibitors for oxymethylene polymers. Melby discloses cross-linking polyoxymethylenes with (meth)acrylates and (meth)acrylamides, among others. Kray discloses vinyl polymers having side chains containing amide or lactam groups as stabilizers for oxymethylene polymers. Hattori discloses heat stabilized polyacetal resin compositions containing copolymers of polyesters, (meth)acrylates, (meth)acrylamides, triallyl cyanurate, diallyl phthalate, vinyl acetate and divinyl benzene. Japanese Patent Publication No. 14329/68 discloses copolymers of acrylamide or acrylamide derivatives and acrylic alkylesters, vinyl ethers or vinyl ketones, or copolymers of acrylamide derivatives and styrene as stabilizers for formaldehyde polymers. Muller discloses the use of certain monomeric urethane methylol ethers containing free hydroxyl groups as stabilizers for polyacetals. Wolters discloses stabilization of polyacetal compositions by blending therewith a combination of an alkaline earth metal compound and a monomeric ester of an (alkyl-hydroxylphenyl)-carboxylic acid with a polyol. Ishii discloses stabilization of polyacetal compositions by blending therewith a compound of the formula $R(NHCOCH_2X)_n$ where R is a hydrocarbon group, X is a cyano or carbamoyl group, and n is 2-6. Kohan discloses stabilization of polyacetal compositions by blending therewith an amide oligomer. Johnson discloses stabilization of polyacetal compositions by blending therewith a dispersion of polyamide in a carrier resin. Japanese 22669 discloses stabilization of polyacetal compositions with ethylene-vinyl acetate copolymer and Japanese 48051 discloses stabilization of polyacetal compositions with epichlorohydrin polymers and metal soap, epoxy compounds or organic phosphites.

While each of the references discussed above disclose various means for improving the stability of polyacetal compositions, none disclose the stabilization system used in the compositions of the present invention.

U.S. Pat. No. 3,310,608, granted Mar.21, 1967 to Matsubayashi et al. discloses polyacetal homopolymer compositions which have been modified to improve dyeability and transparency by melt blending therewith, among other things, vinyl alcohol polymers. None of the Examples use purified hydroxy containing polymer or oligomer and none of the Examples use hydroxy containing polymer or oligomer in the amounts used in the present invention.

U.S. Pat. No. 3,322,740, granted May 30, 1967 to Kiff et al. discloses acetal resins, which are not "polyacetals" as that term is used in describing the present invention, which resins are modified to improve impact strength by incorporation into such resins of an alkylene oxide-polyol polyether, in amounts of from about 10 to about 50 percent.

U.S. Pat. Nos.3,406,129 and 3,406,130, granted Oct. 15, 1968 to Price and Neff, respectively, disclose melt blends cellulose polymer having free hydroxyl groups with up to 50% of acetal polymer and colloidal dispersions of such blends with certain solvents for the cellulose polymer, which compositions are alleged to have improved melt strength and elongation.

U.S. Pat. No. 4,555,357, granted Nov. 26, 1985 to Kausga et al. discloses polyacetal resin compositions containing 0.1–15 weight percent of an amide of the formula

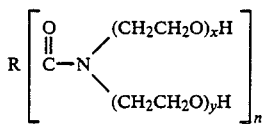

where R is carboxylic acid residue, x and y are 0-10 and n is 1-6. None of the Examples disclose compounds of the above formula which are polymeric or oligomeric.

East German Patent No. 61,345, published Apr. 4, 1968, discloses polyacetal compositions modified with 1-15 weight percent of trimethylol propane as a plasticizer to impart increased resistance to breakage by bending.

None of the references discussed immediately above deal with stabilization of polyacetal compositions, and while some disclose incorporating hydroxy-containing polymers into polyacetal compositions, none disclose the particular hydroxy containing polymers used in the compositions of the present invention, or the unexpected improved stability resulting therefrom.

DISCLOSURE OF THE INVENTION

This invention relates to certain polyacetal compositions which are characterized by improved stability. The term "polyacetal" as used herein includes homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification.

It has been found that polyacetals can be formulated into compositions having improved stability. More specifically, when polyacetals are melt compounded with certain polymers or oligomers containing both hydroxy groups and at least one other functional group that is a stronger Lewis base than the hydroxy group, the resulting compositions are characterized by improved stability as measured by lower evolution of formaldehyde, improved color retention, reduced contamination, reduced mold deposit and improved melt stability.

Typical commercially available polyacetal compositions are stabilized with polyamide (such as disclosed in Alsup et al, U.S. Pat. No. 2,993,025). Polyamides can react with formaldehyde released during processing, resulting in the reaction products and/or decomposition products contaminating the molded article. The polymer or oligomer stabilizers used in the compositions of the present invention do not degrade or form contamination as readily as the conventional nylon stabilizers. In addition, they provide improved stability of the polyacetal when subjected to long heating times.

The polyacetals used in the compositions of the present invention can be branched or linear and will generally have a number average molecular weight in the range of 10,000 to 100,000, preferably 20,000 to 70,000. The molecular weight can conveniently be measured by gel permeation chromatography in m-cresol at 160° C. using a Du Pont PSM bimodal column kit with nominal pore size of 60 and 1000 Å. Although polyacetals having higher or lower molecular weight averages can be used, depending on the physical and processing properties desired, the polyacetal molecular weight averages mentioned above are preferred to provide optimum balance of good mixing of the various ingredients to be melt blended into the composition with the most desired combination of physical properties in the molded articles made from such compositions.

As indicated above, the polyacetal can be either a homopolymer, a copolymer or a mixture thereof Copolymers can contain one or more comonomers, such as those generally used in preparing polyacetal compositions. Comonomers more commonly used include alkylene oxides of 2-12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide.

Generally polyacetal homopolymer is preferred over copolymer because of its greater stiffness. Preferred polyacetal homopolymers incude those whose terminal hydroxyl groups have been end-capped by a chemical reaction to form ester or ether groups, preferably acetate or methoxy groups, respectively.

The polymer or oligomer stabilizer used in the compositions of the present invention is a polymer or oligomer containing both hydroxy groups and at least one other functional group that is a stronger Lewis base than the hydroxyl group. Examples of the other functional group include amides, amines, ureas and urethanes. Amides and amines are preferred; amides are most preferred.

The hydroxy group can be incorporated into the polymer or oligomer by using an appropriate hydroxy containing monomer, e.g., hydroxy alkyl acrylates or methacrylates. Alternatively, the hydroxy groups can be generated on the polymer or oligomer by transforming another group into a hydroxy group, e.g., by hydrolysis of esters or epoxides, or by reduction of carbonyl groups.

Similarly, the other functional group can be incorporated into the polymer or oligomer by using an appropriate monomer, e.g., acrylamide, methacrylamide, N-alkylaminoalkyl acrylate, N-alkylaminoalkyl methacrylate, or N-vinylpyrrolidone. Alternatively, the other functional group can be generated on the polymer or oligomer by modification of the polymer or oligomer.

The quantity of hydroxy groups in polymer or oligomer stabilizer should be such that the atoms in the backbone to which the hydroxy groups are attached, either directly or indirectly are separated from each other (i.e. connected to each other) by not more than twenty chain atoms. Preferably, the polymer or oligomer stabilizer will contain at least one hydroxy group per each twenty carbon atoms in the backbone of the polymer or oligomer and not more than one hydroxy group per carbon atom in the backbone. More preferably, the ratio of hydroxy groups to carbon atoms in the backbone will be 1:2-1:10, and most preferably 1:2-1:5.

The quantity of the other functional group can be up to 50 equivalent percent of the number of equivalents of hydroxy groups in the polymer or oligomer. Preferably, the other functional group will be 1-25 equivalent percent (based on the equivalents of hydroxy groups), most preferably 2-10 percent.

In addition to the hydroxy groups and the other functional groups referred to above, it should be understood that the polymer or oligomer can also contain other functional groups and/or monomers to alter the melting point or viscosity of the polymer or oligomer, or to adjust compatability of the polymer or oligomer with the polyacetal. Altering the melting point or viscosity can help control dispersion of the stabilizer in polyacetal. Adjusting compatability can help achieve desirable properties, e.g., appearance, toughness and mold deposit, in the polyacetal composition. Examples of other monomers that may be thus incorporated include styrene, ethylene, alkyl acrylates, alkyl methacrylates and acrylonitrile.

Specific preferred polymers include copolymers of hydroxypropyl methacrylate with acrylamide, methacrylamide, dimethylaminoethyl methacrylate, or vinyl 2-pyrrolidone.

To achieve the improvements mentioned above, i.e., lower evolution of formaldehyde, improved color retention, reduced contamination, reduced mold deposit and improved melt stability, the polymer or oligomer stabilizer will be present in the compositions of the present invention in the amount of 0.1 to 10 weight percent, based on the amount of polyacetal, preferably 0.2–4.0 weight percent and most preferably 0.6–2.5 weight percent. Lower amounts of the polymer stabilizer can also be used, e.g., as little as 0.005 weight percent, and although the improvements mentioned above may not be realized, use of the polymer stabilizer having the requisite purity, as discussed below, will prevent destabilization of the polyacetal.

It is important that the polymer or oligomer stabilizer used in the compositions of the present invention be substantially free of compounds which destabilize acetal resins. Compounds which might occur in significant quantities in polymers or oligomers useful in the compositions of the present invention include basic materials and acidic materials.

In stabilizing ester-capped or partially ester-capped polyacetal homopolymer, alkali or alkali earth acetates or such salts of other organic acids should be removed to less than 40 ppm, preferably less than about 10 ppm. Of course, it is understood that basic materials, even if volatile, can destabilize polyacetal homopolymer resins and accordingly should, if present, also be removed. In stabilizing polyacetal copolymer or homopolymer that is substantially all ether-capped, higher concentrations (e.g., 1 weight percent) of basic materials can be tolerated. In addition, it should be understood that if the impurity is only weakly basic, as compared with sodium acetate, relatively higher amounts can be tolerated.

In stabilizing both homopolymer and copolymer polyacetal, acidic impurities in the polymer or oligomer stabilizer should be minimized. Polymer or oligomer used in the compositions of the present invention may contain acidic salts, such as ferric choride, zinc chloride or other Lewis acids. Such salts should be removed to levels of not more than 40 ppm and preferably to 10 ppm. As with the basic impurities, it should be understood that if the impurity is only weakly acidic, as compared with ferric chloride or zinc chloride, relatively higher amounts can be tolerated.

Accordingly, when such acidic and/or basic impurities are present in amounts greater than the threshhold amounts stated above, the polymer or oligomer should be purified before it is introduced into the compositions of the present invention. Polymers or oligomers used in the compositions of the present invention can be purified by washing with an appropriate liquid, such as methanol and/or water.

The molecular weight of the stabilizers used in the compositions of the present invention is not critical. As noted above, this material can be oligomeric. Thus, low molecular weight stabilizers are contemplated. Similarly, high molecular weight stabilizers are also contemplated, although for ease of processing and commercial availability, it is generally preferred that the stabilizer have a molecular weight from 1,000 to 1,000,000. The polymer should have a sufficiently high molecular weight to avoid problems of volatility or excessive migration to the surface of the polyacetal during processing. Similarly, excessively high stabilizer viscosity (from molecular weight and/or chemical composition) can make it difficult to disperse the stabilizer in the polyacetal. A stabilizer molecular weight of 2000–200,000 is preferred, with 3000–100,000 most preferred.

It should be understood that the compositions of the present invention can include, in addition to the polyacetal and the stabilizing polymer, other ingredients, modifiers and additives as are generally used in polyacetal molding resins, including co-stabilizers (such as those disclosed in U.S. Pat. Nos. 3,960,984 and 4,098,843), anti-oxidants, pigments, colorants, toughening agents, reinforcing agents and fillers. It should also be understood that some pigments and colorants can, themselves, adversely affect the stability of polyacetal compositions.

The compositions of the present invention can be prepared by mixing the polymer or oligomer stabilizer with the polyacetal polymer at a temperature above the melting points of these two components of the compositions using any intensive mixing device conventionally used in preparing thermoplastic polyacetal compositions, such as rubber mills, internal mixers such as "Banbury" and "Brabender" mixers, single or multiblade internal mixers with a cavity heated externally or by friction, "Ko-kneaders", multibarrel mixers such as "Farrel Continuous Mixers", injection molding machines, and extruders, both single screw and twin screw, both co-rotating and counter rotating. These devices can be used alone or in combination with static mixers, mixing torpedos and/or various devices to increase internal pressure and/or the intensity of mixing, such as valves, gates or screws designed for this purpose. Extruders are preferred. Of course, such mixing should be conducted at a temperature below which significant degradation of the components of the composition will occur.

Shaped articles can be made from the compositions of the present invention using any of several common methods, including compression molding, injection molding, extrusion, blow molding, rotational molding, melt spinning and thermoforming. Injection molding is preferred. Examples of shaped articles include sheet, profiles, rod stock, film, filaments, fibers, strapping, tape tubing and pipe. Such shaped articles can be post treated by orientation, stretching, coating, annealing, painting, laminating and plating. Such shaped articles and scrap therefrom can be ground and remolded.

Processing conditions used in the preparation of the compositions of the present invention and shaped articles made therefrom include melt temperatures of about 170°–260° C., preferably 185°–240° C., most preferably 200°–230° C. When injection molding the compositions of the present invention, it is preferred that the mold be as cold as possible consistent with the intracacy of the shape being produced. Generally, the mold temperature will be 10°–120° C., preferably 10°–100° C., and most preferably about 50°–90° C.

In the following examples, there are shown specific embodiments of the present invention and certain comparisons with embodiments of control experiments outside the limits of the present invention. It will be seen that the compositions of the present invention are characterized by improved stability. All parts and percentages are by weight, and all temperatures are in degrees Celsius unless otherwise specified. Measurements not originally in SI units have been so converted and rounded where appropriate.

In the following examples, thermal stability of the compositions was determined using a thermally evolved formaldehyde (TEF) test procedure. A weighed sample of polyacetal composition was placed in a tube and the tube was fitted with a cap for introduction of nitrogen to the test sample for removal of any evolved gases from the apparatus while maintaining the sample in an oxygen-free environment. The sample was heated at 259° C. in a silicon oil bath. The nitrogen and any evolved gases transported thereby were bubbled through 75 ml of a 40 g/l sodium sulfite in water solution. Any evolved formaldehyde reacts with the sodium sulfite to liberate sodium hydroxide. The sodium hydroxide was continuously neutralized with standard 0.1 N HCl. The results were obtained as a chart of ml of titer versus test time. The percent evolved formaldehyde was calculated by the formula $$(V)(N)\left[\frac{0.03 \times 100}{SW}\right]$$

where
V is the volume of titer in milliliters
N is the normality of the titer, and
SW is the sample weight in grams.
The factor "0.03" is the milliequivalent weight of formaldehyde in g/milliequivalent.

Thermal evolved formaldehyde results are conveniently reported for thirty (TEF$_{30}$) and sixty (TEF$_{60}$) minutes heating. TEF$_{60}$ results are especially revealing of the improved long term stability of the compositions of the present invention.

In the following examples, stability of the compositions was also evaluated using a contamination study. In that study, each composition extruded under conditions likely to produce contamination, evidenced as black specks in pellets of natural (uncolored) resin.

In the following examples, stability of the compositions was also evaluated using a Hunter Tristimulus Colorimeter to quantify color of tensile bars molded from such compositions.

Elongation was measured using ASTM D-638 procedures and notched izod was measured using ASTM D-256.

EXAMPLES 1–6

Polymer stabilizers of the present invention were prepared for the following examples by polymerizing solution of the monomers in a solvent at various temperatures, all as detailed in Table 1, below. The polymerizations were conducted at atmospheric pressure, and in each case, 2,2'-azobis(2,4-dimethylvaleronitrile) free radical initiator was used. The resulting polymers were isolated by adding the polymer solution to a nonsolvent for the polymer. After drying the polymer, 1 weight percent of the polymer was mixed with acetate end-capped polyacetal homopolymer (number average molecular weight - Mn - as specified in Table 1, below), and with 0.1 weight percent of 2,2'-methylene-bis(4-methyl-6-tert-butyl phenol) antioxidant. These ingredients were melt compounded on a 2.54 cm single screw extruder. TEF results and a color evaluation are summarized in Table 1:

TABLE 1

| Example | Stabilizer Composition Monomer 1 | Monomer 2 | Stabilizer Polymerization Solvent | Temperature | Polyacetal Mn (× 1000) | TEF - % Formaldehyde 10 min. | 15 min. | 20 min. | 30 min. | 60 min. | Color 60 min. |
|---|---|---|---|---|---|---|---|---|---|---|---|
| 1 | 90% HPMA | 10% AAM | 2-propanol | 80.4–87.3° C. | 65 | 0.07 | 0.13 | 0.24 | 0.59 | 1.59 | VVSY |
|   |           |         |            |                | 45 | 0.07 | 0.18 | 0.35 | 0.65 | 1.46 | VVSY |
|   |           |         |            |                | 33 | —    | 0.18 | —    | 0.65 | —    | —    |
| 2 | 95% HPMA | 5% DMAEMA | 2-propanol | 76.5–85.9° C. | 65 | 0.10 | 0.21 | 0.37 | 0.83 | 1.99 | white |
|   |           |         |            |                | 45 | 0.12 | 0.34 | 0.64 | 1.20 | 2.42 | white |
|   |           |         |            |                | 33 | —    | 0.28 | —    | 1.04 | —    | —    |
| 3 | 80% HPMA | 20% MAAM | 2-propanol | 76.1–86.0° C. | 65 | 0.08 | 0.18 | 0.34 | 0.79 | 1.97 | VVSY |
|   |           |         |            |                | 45 | 0.06 | 0.21 | 0.38 | 0.73 | 1.47 | VVSY |
|   |           |         |            |                | 33 | —    | 0.21 | —    | 0.88 | —    | —    |
| 4 | 100% HPMA | —      | 2-propanol | 78.6–81.3° C. | 65 | 0.10 | 0.29 | 0.66 | 1.52 | 3.76 | white |
|   |           |         |            |                | 45 | 0.10 | 0.27 | 0.58 | 1.07 | 1.87 | white |
|   |           |         |            |                | 33 | —    | 0.29 | —    | 1.16 | —    | —    |
| 5 | nylon     | —      | —          | —              | 65 | 0.04 | 0.10 | 0.19 | 0.54 | 4.48 | DB |
|   |           |         |            |                | 45 | 0.08 | 0.19 | 0.30 | 0.64 | 3.87 | DB |
|   |           |         |            |                | 33 | 0.07 | 0.15 | 0.30 | 0.58 | 2.97 | DB |
| 6 | —         | —      | —          | —              | 65 | 0.14 | 0.48 | 1.18 | 2.63 | 4.26 | white |
|   |           |         |            |                | 45 | 0.38 | 1.20 | 1.76 | 2.39 | 4.63 | white |
|   |           |         |            |                | 33 | 0.91 | 1.52 | 2.00 | 3.21 | 7.70 | white |

Legend for Table 1
HPMA = hydroxypropyl methacrylate
AAM = acrylamide
DMAEMA = dimethylaminoethyl methacrylate
MAAM = methacrylamide
nylon = 33/23/43 terpolymer of nylon 66, nylon 6/10 and nylon 6, respectively
VVSY = very very slight yellow
DB = dark brown

EXAMPLES 7–8

The polymer stabilizer of the present invention used in Example 7 was the same as in Example 1, above. One weight percent of the stabilizer was melt compounded with acetate end-capped polyacetal homopolymer having a number average molecular weight of about 65,000 on a 6.35 cm single screw extruder. Example 8 resulted from similar melt compounding of 0.7 weight percent of the nylon from Example 5 with the same polyacetal as in Example 7. TEF results were obtained on the respective extrudates and a slope value equal to 10 times the % formaldehyde evolved between 28 and 30 minutes was calculated. The slope value is indicative of resin stability at long test times. In addition, the extrudates were injection molded simulating difficult molding conditions (melt temperature =227° C.; hold up time =18 minutes). The resulting bars were reground and remolded. Physical properties and the color of the test bars are summarized in Table 2, below:

TABLE 2

| | TEF - % Formaldehyde | | | Phys. Prop. | | |
|---|---|---|---|---|---|---|
| Example | 15 min. | 30 min. | slope | % elon. | N.I. | Color |
| 7 | 0.04 | 0.25 | 0.36 | 56.6 | 2.24 | white |
| 8 | 0.07 | 0.35 | 0.64 | 62.2 | 2.46 | tan |

EXAMPLES 9-11

A solution of 450 grams of acrylamide and 8550 grams of hydroxypropyl methacrylate was polymerized in 18,000 grams of methanol at 85°-95° C. and a pressure of $3 \times 10^5 - 5 \times 10^5$ Pascals using a 2,2'-azobisisobutyronitrile initiator. The resulting polymer was isolated by removing the methanol in an 80° C. vacuum oven. The dried polymer was ground to about 0.5 cm particle size and was used as the stabilizer in Example 9.

In similar fashion, 225 grams of hydroxypropyl methacrylate was polymerized with 25 grams of vinyl-2-pyrrolidone in 600 ml of methanol at 61.8°-65.7° C. using t-amyl-peroxyneodecanoate initiator. The polymer was isolated by addition of the methanol solution to water, followed by drying in a vacuum oven. This material was used as the stabilizer in Example 10.

The nylon stabilizer used in Example 11 was the same as in Example 5.

In each example, one weight percent of the stabilizer and 0.05 weight percent of hindered phenol antioxidant were melt blended with acetate end-capped polyacetal homopolymer in a 5.08 cm single screw extruder; and the resulting extrudates were each tested for TEF and color after 60 minutes. Results are summarized in Table 3, below:

TABLE 3

| | TEF - % Formaldehyde | | | |
|---|---|---|---|---|
| Example | 15 min. | 30 min. | 60 min. | Color |
| 9 | 0.22 | 0.90 | 1.96 | white |
| 10 | 0.15 | 0.70 | 1.45 | white |
| 11 | 0.10 | 0.56 | 3.87 | dark brown |

EXAMPLES 12 AND 13

Blends of acetate end-capped polyacetal homopolymer (Mn =65,000), hydrocinnamic acid (3,5-di-tert-butyl-4-hydroxyneopentane-tetraaryl ester), polymer stabilizer of Example 1 and the nylon stabilizer of Example 5 were prepared on a 6.35 cm single screw extruder using a melt barrier screw at a screw speed of 75 rpm, with barrel heater set points of 230° C., antioxidant, with a feed rate set to keep the screw covered (flood feed) and a two hole die. Melt temperature exit the die was relatively constant at 252°-254° C. for each blend.

Each blend contained 67.5 kg of polyacetal, 68 grams of antioxidant and 680 grams of the stabilizer. Each blend was run for about two hours and product was collected in lots representing sequential 15 minute segments of each run. To quantify the level of contamination, 5 kg of product was taken from the last lot of each run, the pellets were spread out on a white tray, and all the pellets with visible contamination were picked out, counted and characterized. The compositions and results are summarized in Table 4, below:

TABLE 4

| Example | Stabilizer | Contamination |
|---|---|---|
| 12 | Example 1 | 2 small black specks |
| | | 2 yellow specks |
| 13 | Example 5 | 34 small black specks |
| | | 1 large black speck |
| | | 3 discolored cubes |

In addition, an observation was made of buildup of die drip on the die plate during each run. Example 12 showed very light accumulation, white to tan to brown, growing out from the die around the strand like a calyx. Example 13 showed substantial accumulation of a brittle black halo around the die hole.

EXAMPLES 14 AND 15

Blends of the same ingredients used in Examples 12 and 13 were prepared on a 6.35 cm single screw extruder using a melt barrier screw at a temperature of 195° C. and a screw spped of 45 rpm, and tensile bars were prepared.

A Hunter Tristulus Colorimeter was used to quantify the color of the tensile bars. In each case, the tensile bar was cut in half, and the halves were taped together to give sufficient surface area for color measurement.

Each blend contained 89.8 kg of polyacetal, 91 grams of antioxidant and. 0.91 kg of the stabilizer of Example 1 (Example 14) or 0.63 kg of the stabilizer of Example 5 (Example 15). For each sample, three paramters were measured. "L" is a measure of lightness with 0=black and 100=white. "a" is a measure of red/green balance with positive values indicating a shift toward red and negative values indicating a shift toward green. "b" is a measure of yellow/blue balance with positive values indicating a shift toward yellow and negative values indicating a shift toward blue.

The blend compositions and results of the color evaluation are summarized in Table 5, below:

TABLE 5

| | Virgin Molding | | | |
|---|---|---|---|---|
| Example | L | a | b | Description |
| 14 | 77.8 | −1.1 | −1.4 | white |
| 15 | 76.2 | −2.1 | 3.2 | light tan |
| | 100% Regrind Molding | | | |
| Blend | L | a | b | Description |
| 14 | 77.1 | −1.2 | −0.9 | white |
| 15 | 72.8 | −2.3 | 7.7 | tan |

I claim:
1. A thermoplastic polyacetal composition consisting essentially of
  (a) 0.1-10 weight percent of at least one compound selected from the group consisting of polymers and oligomers containing both hydroxy groups and at least one other functional group that is a stronger Lewis base than the hydroxy groups, and

(b) 90–99.9 weight percent of at least one polyacetal polymer, provided that the above-stated percentages are based on the total amounts of components (a) and (b) only, provided further that the atoms in the backbone of the polymer or oligomer to which the hydroxy groups are attached, directly or indirectly, are separated by not more than twenty chain atoms; provided further that the quantity of the at least one other functional group is up to 50 equivalent percent of the number of equivalents of hydroxy groups in the component (a); and provided further that the component (a) is substantially free of acidic materials.

2. The composition of claim 1 wherein the polyacetal is homopolymer and the component (a) is substantially free of acidic materials and basic materials.

3. The composition of claim 1 wherein the component (a) is substantially free of acid salts and non-volatile ash of a basic character.

4. The composition of claims 1, 2 or 3 wherein component (a) comprises 0.2–4.0 weight percent of the composition.

5. The composition of claims 1, 2 or 3 wherein component (a) comprises 0.6–2.5 weight percent of the composition.

6. The composition of claims 1, 2 or 3 wherein the ratio of hydroxy groups to carbon atoms in the backbone of the polymer or oligomer is in the range 1:1–1:20.

7. The composition of claim 3 wherein the ratio of hydroxy groups to carbon atoms in the backbone of the polymer or oligomer is in the range 1:2–1:20.

8. The composition of claims 1, 2 or 3 wherein the ratio of hydroxy groups to carbon atoms in the backbone of the polymer or oligomer is in the range of 1:2–1:10.

9. The composition of claims 1, 2 or 3 wherein the ratio of hydroxy groups to carbon atoms in the backbone of the polymer or oligomer is in the range 1:2–1:5

10. The composition of claims 1, 2 or 3 wherein the quantity of the at least one other functional group is 1–25 equivalent percent of the number of equivalents of hydroxy groups in component (a).

11. The composition of claims 1, 2 or 3 where the quantity of the at least one other functional group is 2–10 equivalent percent of the number of equivalents of hydroxy groups in component (a).

12. The composition of claims 1, 2 or 3 wherein component (a) is a copolymer of hydroxypropyl methacrylate and a comonomer selected from the group consisting of acrylamide, methacrylamide, dimethylaminoethyl methacrylate, and vinyl-2-pyrrolidone.

13. The composition of claims 1, 2 or 3 wherein component (a) is hydroxypropyl methacrylate/acrylamide copolymer.

14. The composition of claims 1 or 3 wherein the polyacetal polymer is a homopolymer.

15. The composition of claim 14 wherein the component (a) contains not more than 40 ppm of acidic materials.

16. The composition of claim 2 wherein component (a) contains not more than 40 ppm of basic materials and not more than 40 ppm of acidic materials.

17. The composition of claims 1, 2 or 3 wherein the polyacetal has a number average molecular weight of 10,000–100,000.

18. The composition of claims 1, 2 or 3 further comprising at least one of co-stabilizers, antitioxidants, pigments, colorants, reinforcing agents, toughening agents and fillers.

19. The composition of claims 1, 2 or 3 further comprising a nylon co-stabilizer.

20. Shaped articles made from the composition of claims 1, 2 or 3.

21. A method of preparing the composition or claims 1, 2 or 3 comprising mixing the hydroxy containing compound with the polyacetal polymer at a temperature above the melting points of the components or the composition and below the temperature at which degradation of the components will occur.

* * * * *